(12) United States Patent
Burger et al.

(10) Patent No.: US 11,981,256 B2
(45) Date of Patent: May 14, 2024

(54) SHADING DEVICE IN A MOTOR VEHICLE

(71) Applicant: MERCEDES-BENZ GROUP AG, Stuttgart (DE)

(72) Inventors: Benjamin Burger, Weil im Schönbuch (DE); Steffen Klapper, Mühlacker (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 0 days.

(21) Appl. No.: 18/016,976

(22) PCT Filed: Jun. 30, 2021

(86) PCT No.: PCT/EP2021/068030
§ 371 (c)(1),
(2) Date: Jan. 19, 2023

(87) PCT Pub. No.: WO2022/017748
PCT Pub. Date: Jan. 27, 2022

(65) Prior Publication Data
US 2023/0226972 A1 Jul. 20, 2023

(30) Foreign Application Priority Data

Jul. 20, 2020 (DE) ...................... 10 2020 004 326.7

(51) Int. Cl.
*B60Q 3/12* (2017.01)
*B60Q 3/76* (2017.01)
(Continued)

(52) U.S. Cl.
CPC ................. *B60Q 3/12* (2017.02); *B60Q 3/76* (2017.02); *B60Q 3/80* (2017.02); *H05B 47/11* (2020.01)

(58) Field of Classification Search
CPC ... B60Q 3/12; B60Q 3/76; B60Q 3/80; H05B 47/11
See application file for complete search history.

(56) References Cited

U.S. PATENT DOCUMENTS 5,526,065 A * 6/1996 Todoriki ................ B60K 35/00
348/835
2013/0162924 A1 6/2013 Sahouani et al.
(Continued)

FOREIGN PATENT DOCUMENTS

DE 4107021 C2 8/1994
DE 10126186 A1 12/2002
(Continued)

OTHER PUBLICATIONS

International Search Report and Written Opinion dated Oct. 8, 2021 in related/corresponding International Application No. PCT/EP2021/068030.
(Continued)

*Primary Examiner* — Alexander H Taningco
*Assistant Examiner* — Pedro C Fernandez
(74) *Attorney, Agent, or Firm* — PATENT PORTFOLIO BUILDERS PLLC

(57) ABSTRACT

A motor vehicle includes a passenger display with a switchable view protection device that is actively switched in predetermined operating states so that display contents shown on the passenger display cannot be seen from the seating area of the driver. The vehicle includes a shading device having an illuminant oriented toward the passenger display and is controlled by a control unit and which, in order to prevent moving residual fragments that can still be detected from the driver's seat despite a view protection device which is switched to shading, externally illuminates the passenger display.

8 Claims, 1 Drawing Sheet

Figure 1:
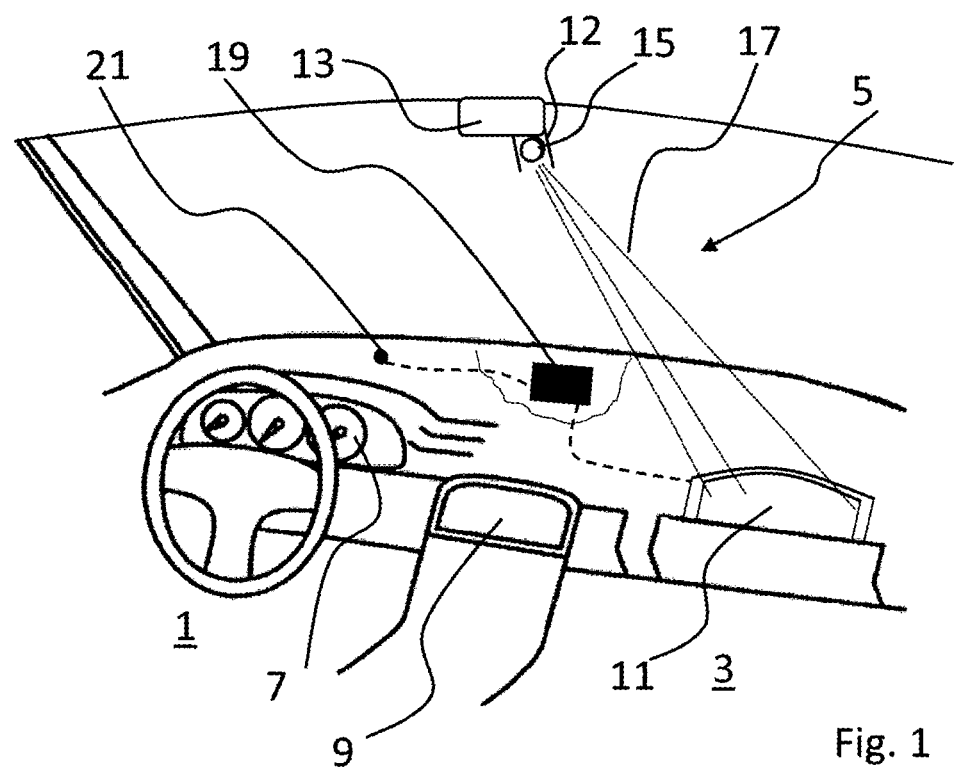

(51) Int. Cl.
*B60Q 3/80* (2017.01)
*H05B 47/11* (2020.01)

(56) References Cited

U.S. PATENT DOCUMENTS

2019/0235152 A1* 8/2019 Aurongzeb ........... G02F 1/1335
2021/0195714 A1* 6/2021 Woodgate ................ G09G 3/20

FOREIGN PATENT DOCUMENTS

| | | |
|---|---|---|
| DE | 102019113024 A1 | 11/2020 |
| EP | 1262741 A1 | 12/2002 |
| EP | 1352784 A2 | 10/2003 |
| FR | 3016722 A3 | 7/2015 |
| GB | 2571266 A | 8/2019 |
| JP | 2015017895 A | 1/2015 |

OTHER PUBLICATIONS

Office Action created Jan. 19, 2021 in related/corresponding DE Application No. 10 2020 004 326.7.
Intent to Grant dated Sep. 29, 2022 in related/corresponding EP Application No. 21742746.7.
International Preliminary Report on Patentability dated Jan. 24, 2023 in related/corresponding International Application No. PCT/EP2021/068030.

* cited by examiner

SHADING DEVICE IN A MOTOR VEHICLE

BACKGROUND AND SUMMARY OF THE INVENTION

Exemplary embodiments of the invention relate to a shading device for a passenger display in a motor vehicle, the shading device being designed to be switchable to prevent a lateral view of the passenger display.

DE 101 26 186 A1, D1, discloses an illumination device arranged in a vehicle roof and directed towards a reflective display. As a substitute for a backlight, a liquid crystal display is illuminated with daylight reflected by a mirror or light from an illumination device.

DE 10 2019 113 024 A1 discloses a projection device for an interior of a motor vehicle, the projection device comprising a light source for generating light beams and a deflection device for directing the light beams onto a surface of a component in the interior of the motor vehicle.

While a vehicle is in motion, no animations or moving images, such as films, may be displayed to the driver of the vehicle. This leads to the necessity of shading the content for the driver if, for example, a passenger on the passenger side is watching a film. US 2013/0162924 A1 describes a switchable private filter, by means of which information is displayed in at least two modes. In the first mode, a viewing angle is limited so that only a view of the filter from a near-normal orientation is possible. In the second mode, the viewing angle increases so that the information can also be seen from a larger oblique angle.

The disadvantage of the above shading device is that when the driver looks at a screen, moving residual fragments are visible despite active shading, depending on the viewing angle.

By contrast, exemplary embodiments of the invention provide a device and a method by means of which the driver's distraction can be further minimized.

A first aspect of the invention relates to a shading device comprising an illuminant oriented towards the passenger display and controlled by a control unit, which illuminant, in order to prevent moving residual fragments that can still be detected from the driver's seat despite a view protection device being switched to shading, illuminates the passenger display externally of the display. The passenger display can be illuminated with the extraneous light in a targeted manner, and the contrast ratios between the screen brightness and the ambient brightness can be influenced as a result. In other words, the contrast of the illuminated passenger display to the surroundings decreases due to the extraneous light, especially in the dark, and the image on the screen is perceived as less bright, which means that the so-called residual fragments can no longer be detected by the driver. The view protection device is designed, for example, as a switchable view protection film arranged below the cover glass of the passenger display. The passenger display is arranged, for example, as an LCD display with a backlight. In a special embodiment, a dual backlight is used to compensate for brightness fluctuations: one backlight is lit in normal mode, i.e., in public mode, and the other backlight is lit in shaded mode, i.e., in private mode. According to the invention, the control unit controls the brightness of the illuminant depending on the brightness of the passenger display. The control unit receives a brightness signal from the passenger display. The control unit controls the illuminant on the basis of one or more stored characteristic curves that represent an assignment of the display brightness to a brightness of the illuminant. Accordingly, in conjunction with the ambient brightness, a characteristic map can also be stored that reflects a brightness of the illuminant depending on the ambient brightness and the display brightness. In an advantageous manner, an optimized shading of the driver's view can be achieved depending on the screen brightness set by the system or by the user.

In a further preferred embodiment, the device comprises an ambient light sensor, wherein the control unit controls the brightness of the illuminant depending on the ambient brightness. The control unit controls the illuminant based on one or more characteristic curves that reflect an assignment of the ambient brightness to a brightness of the illuminant. The characteristic curves are determined empirically by setting the brightness of the illuminant at different ambient brightness levels in such a way that no residual fragments, i.e., shadows, are visible on the passenger display from the driver's position when the view protection device is switched to shading. In a preferred embodiment, the ambient light sensor is shielded from the incident light of the illuminant and of the passenger display, since otherwise a change in the light intensity of the illuminant would be interpreted as a change in the ambient brightness. The shielding is achieved, for example, by a remote arrangement from the passenger display and/or a shielding housing.

In a development, the illuminant is only activated above a predefined speed limit. In the low speed range, the danger of the driver being distracted by residual fragments is low, so activation of the illuminant can be spared.

In a modified embodiment, the illuminant comprises an aperture that focuses light emitted by the illuminant onto the passenger display. By focusing the light emitted by the illuminant, the vehicle interior is not illuminated more than necessary, which reduces distraction of the driver.

In a further preferred embodiment, the illuminant is arranged in a control module preferably located in the vehicle headliner. Such a control module is usually arranged in the roof area between the driver and passenger and comprises, for example, controls for the sunroof, interior lighting and reading lights. In addition to a favorable position, integration of the illuminant in the control module already offers corresponding connection options for power and data lines, which means that the shading device according to the invention can be implemented cost-effectively.

In another exemplary embodiment, the passenger display adjusts the screen brightness depending on the ambient light. In order to ensure the best possible recognizability of content and at the same time the lowest possible glare for the viewer, the screen brightness is lowered in darkness and raised in high ambient brightness. In conjunction with the illuminant, effective shading of the driver's view and the high image quality required for relaxed viewing by the passenger can be realized in all operating conditions of the passenger display.

In a further or alternative embodiment, the passenger display comprises a prismatic foil which, in order to avoid reflections in a windscreen of the motor vehicle which are irritating for the driver, causes the screen brightness to be dimmed from a predefined limit angle. In particular, reflections of the light rays of the illuminant caused by the passenger display, which are reflected on the windscreen and lead to obstructed vision and distraction of the driver, are prevented by the prismatic foil. The prismatic foil is designed here in such a way that a defined dimming of the light emission at the display surface takes place from a predefined vertical limit angle.

A second aspect of the invention relates to a motor vehicle having a shading device comprising aforementioned features.

A third aspect of the invention relates to a method for controlling a shading device, wherein the passenger display is illuminated in order to prevent moving residual fragments that can still be recognized from the driver's seat despite a view protection device being switched to shading, wherein the brightness of the illuminant is controlled here depending on the brightness of the passenger display. By means of the control of the shading device according to the invention, an effective shading of the display contents for an observer sitting on the driver's seat is achieved under all ambient conditions and display brightnesses. The intensity of the illuminant is controlled here in such a way that residual fragments in the form of moving shadows on the passenger display can no longer be perceived.

Further advantages, features and details will become clear from the following description, in which—if necessary with reference to the drawing—at least one exemplary embodiment is described in detail.

BRIEF DESCRIPTION OF THE DRAWING FIGURES

Figure 2:
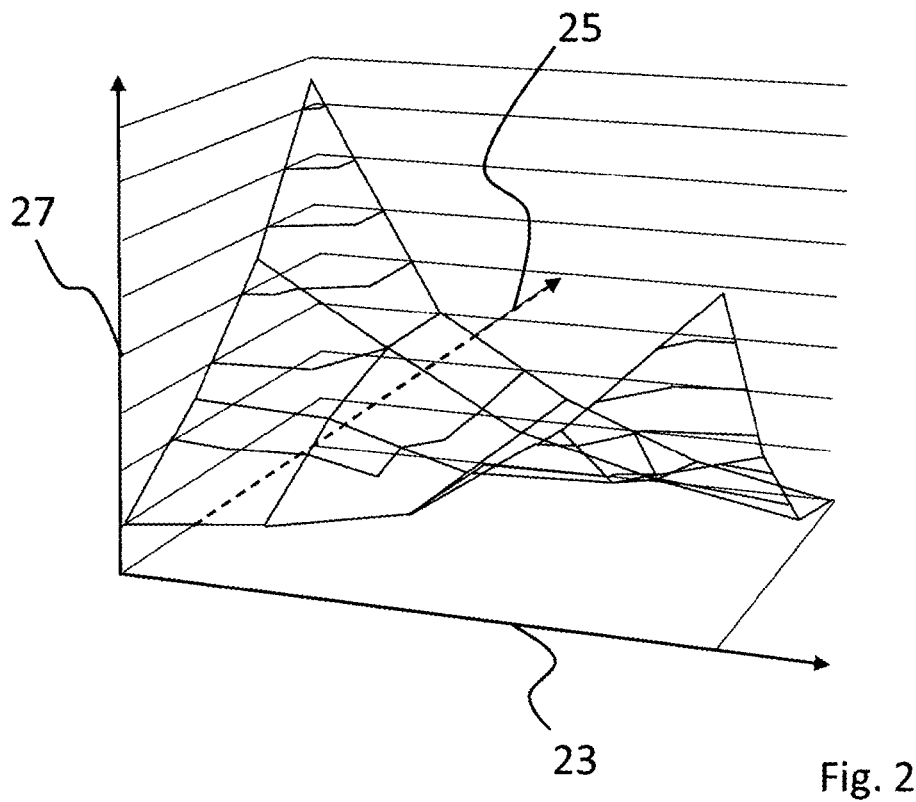

In the drawings:

FIG. 1 shows an interior of a motor vehicle with a shading device according to the invention and FIG. 2 shows a characteristic map for controlling the illuminant of the shading device depending on the ambient brightness and brightness of the passenger display.

DETAILED DESCRIPTION

According to FIG. 1, an occupation or seating area of a driver 1 and a passenger 3 of a schematically depicted vehicle interior 5 is shown. The vehicle has an instrument cluster 7 assigned to the occupation area of the driver 1, a centrally arranged display 9, and a passenger display 11. The instrument cluster 7 displays data relevant to driving to the driver, the centrally arranged display 9 is provided for the driver and passenger, for example for setting radio stations or an interior temperature, and the passenger display 11 is provided for entertaining the passenger with moving images such as films, television programs, etc. The passenger display comprises a switchable view protection device. The view protection device known from the prior art and embodied, for example, in the form of a view protection film is switched to active as soon as animated or moving images are shown, so that these cannot be detected by a person in the driver's seat, i.e., in the occupation area of the driver 1. However, the shading of the driver's view of the display by activating the view protection is insufficiently successful with the corresponding display and ambient brightness, since due to a high contrast ratio between the ambient brightness and the brightness of the passenger display 11, the driver 1 can still detect moving shadows from their occupation or seating area.

A roof control unit 13 is also arranged in the vehicle interior 5. In addition to various controls for the sunroof, reading lights, etc., which are not shown, an illuminant 15 is arranged in the roof control unit 13. The light beam 17 emitted by the illuminant 15 is focused on the passenger display 11 by means of an aperture 12.

The illuminant 15 is connected to a control unit 19 via a data line that is not shown. The control unit 19 is in turn connected to the passenger display 11 and an ambient light sensor 19 via a data line.

Characteristic curves stored in the control unit 19 assign a brightness value of the illuminant 15 to each brightness value in the vehicle interior 5 and to each brightness value of the passenger display 11.

The illuminant 15 is controlled by the control unit 19 in such a way that it assumes the brightness value determined from characteristic curves or the characteristic map as a function of the ambient brightness and the brightness of the passenger display.

The light beams emitted by the illuminant 15 are focused on the passenger display 11, which makes it possible to reduce the difference in contrast to the surroundings. The reduction of the contrast differences means that residual fragments are no longer detectable on the passenger display 11 in the occupation area of the driver 1.

FIG. 2 shows an example of a characteristic map stored in the control unit 19 for controlling the illuminant 15. The ambient brightness is plotted on the axis 23 and the brightness of the passenger display is plotted on the axis 25. Each value pair of ambient brightness and display brightness is assigned a brightness of the illuminant 15 that is plotted on the axis 27. The brightness value of the illuminant 15 is interpolated for values lying between the value pairs. The characteristic map can deviate considerably from the one shown depending on the design of the view protection device and the passenger display. The characteristic map shown serves only to clarify the basic relationships.

For example, when the display brightness is very low and at the same time the ambient brightness is low, the brightness of the illuminant 15 should be set to a low level due to the low contrast difference. As the ambient brightness increases while the display brightness remains low, the brightness of the illuminant should be increased due to the increasing contrast.

If the ambient brightness is high and the display brightness is low, the brightness of the illuminant 15 should be increased. As the display brightness increases while the ambient brightness remains high, the brightness of the illuminant 15 can be reduced due to the decreasing contrast.

In order to be able to take all design-related influences into account, the values of the characteristic map are determined empirically. For this purpose, an optimal value for the brightness of the illuminant is determined for corresponding value pairs of ambient brightness and display brightness, i.e., the brightness value that allows the best possible suppression of the contents of the passenger display for an observer located in the occupation area of a driver 1.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A shading apparatus in a motor vehicle, wherein the shading apparatus comprises a passenger display with a switchable privacy device, which is actively switched in predetermined operating states so that display contents shown on the passenger display are unrecognizable from a seating area of the driver, wherein the shading device comprises:

Illumination means, which is orientable towards the passenger display and is activated by a control unit and which illuminates the passenger display to prevent display contents that are still recognizable from the seating area of the driver despite the switchable view protection device being activated and contain residual fragments, wherein the control unit is configured to control the brightness of the illumination means based on a brightness signal received from the passenger display, wherein the brightness signal indicates a particular brightness value of the passenger display of a plurality of possible brightness values of the passenger display.

2. The shading device of claim 1, further comprising:

an ambient light sensor, wherein the control unit is configured to control the brightness of the illumination means depending on ambient brightness detected by the ambient light sensor.

3. The shading device of claim 1, wherein the illumination means comprises an aperture configured to focus light emitted by the illumination means onto the passenger display.

4. The shading device of claim 1, wherein the illumination means is arranged in a control module located in a headliner of the motor vehicle.

5. The shading device of claim 1, wherein the passenger display is configured to adjust a screen brightness of the passenger display as a function of ambient brightness.

6. The shading device of claim 1, wherein the passenger display comprises a prismatic foil which, in order to avoid reflections in a windscreen of the motor vehicle, is configured to cause a screen brightness of the passenger display to be dimmed from a predefined limit angle.

7. A motor vehicle comprising the shading apparatus of claim 1.

8. A method for controlling a shading apparatus for a motor vehicle, the shading apparatus comprising a passenger display with a switchable view protection device that is switched active in predetermined operating states so that display contents shown on the passenger display are unrecognizable from a seating area of the driver, the method comprising:

illuminating the passenger display to prevent display contents that are still recognizable from the seat of the driver despite the switchable view protection device being activated and contain residual fragments, wherein a brightness of an illumination means that illuminates the passenger display is controlled as a function of a brightness signal received from the passenger display, wherein the brightness signal indicates a particular brightness value of the passenger display of a plurality of possible brightness values of the passenger display.

* * * * *